No. 714,780. Patented Dec. 2, 1902.
F. H. CHEYNE.
SPEED CHANGING REVERSING GEAR.
(Application filed Mar. 25, 1902.)

(No Model.) 3 Sheets—Sheet 1.

WITNESSES:
Chas N. Leonard.
Frank A. Fahle

INVENTOR
Frederick H. Cheyne
BY
Bradford Hood
ATTORNEYS

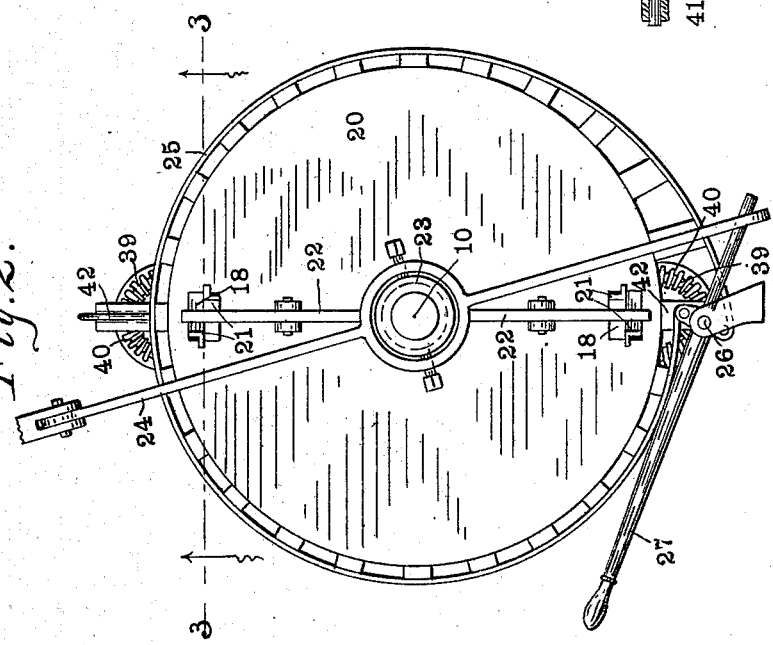

No. 714,780. Patented Dec. 2, 1902.
F. H. CHEYNE.
SPEED CHANGING REVERSING GEAR.
(Application filed Mar. 25, 1902.)
(No Model.) 3 Sheets—Sheet 3.

WITNESSES:
Chas. N. Leonard.
Frank A. Lahle.

INVENTOR
Frederick H. Cheyne
BY
Bradford & Hood
ATTORNEYS

UNITED STATES PATENT OFFICE.

FREDERICK H. CHEYNE, OF INDIANAPOLIS, INDIANA.

SPEED-CHANGING REVERSING-GEAR.

SPECIFICATION forming part of Letters Patent No. 714,780, dated December 2, 1902.

Application filed March 25, 1902. Serial No. 99,834. (No model.)

*To all whom it may concern:*

Be it known that I, FREDERICK H. CHEYNE, a citizen of the United States, residing at Indianapolis, in the county of Marion and State of Indiana, have invented certain new and useful Improvements in Speed-Changing Reversing-Gear, of which the following is a specification.

The object of my invention is to produce a compact driving-gear capable of driving a shaft in either direction and capable of varying the speed of rotation, within certain limits, in either direction.

The accompanying drawings illustrate my invention.

Figure 1:
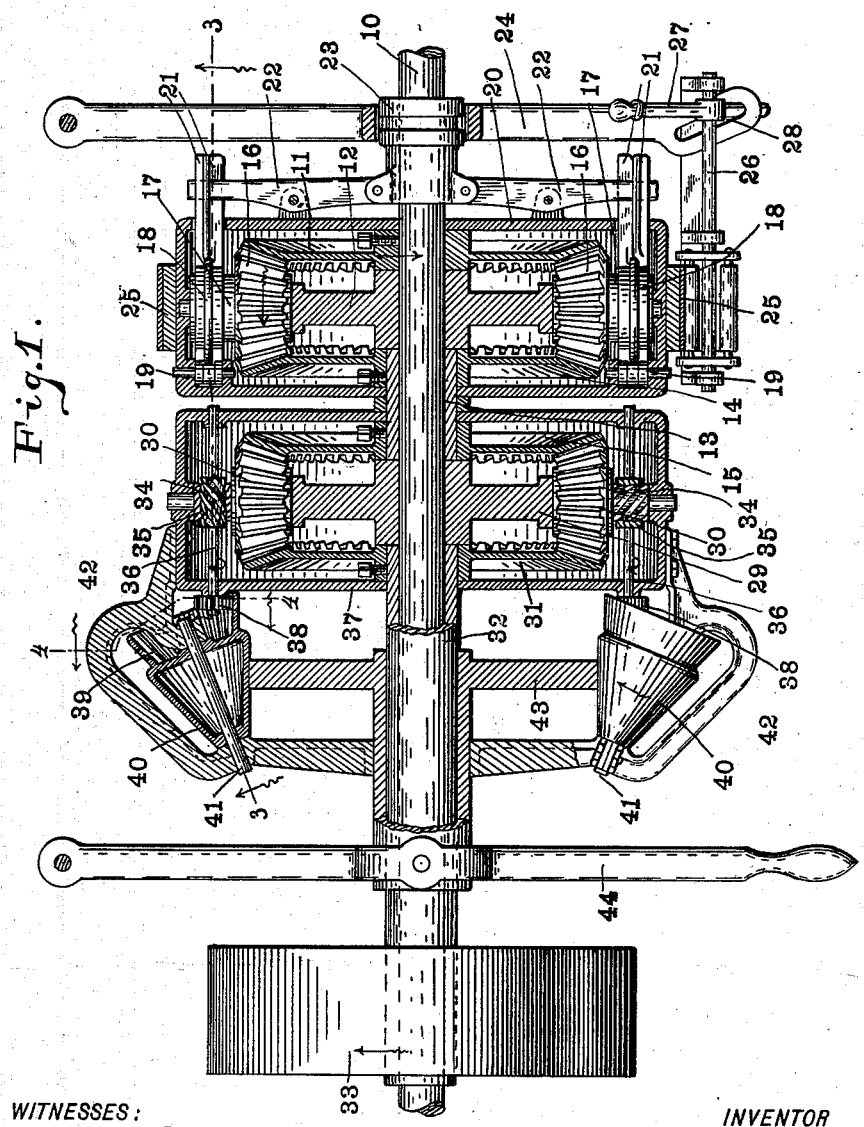
Figure 6:
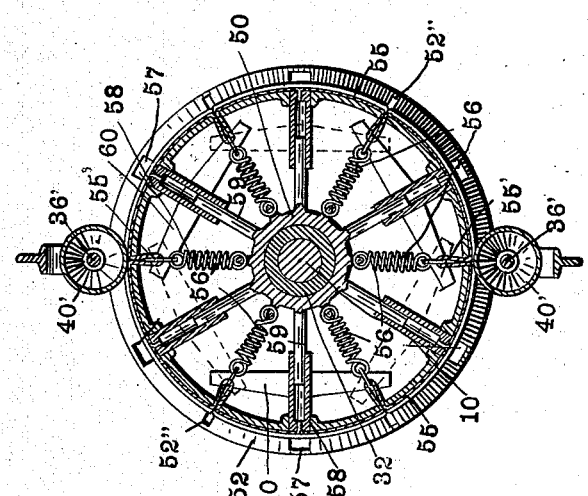
Figure 5:
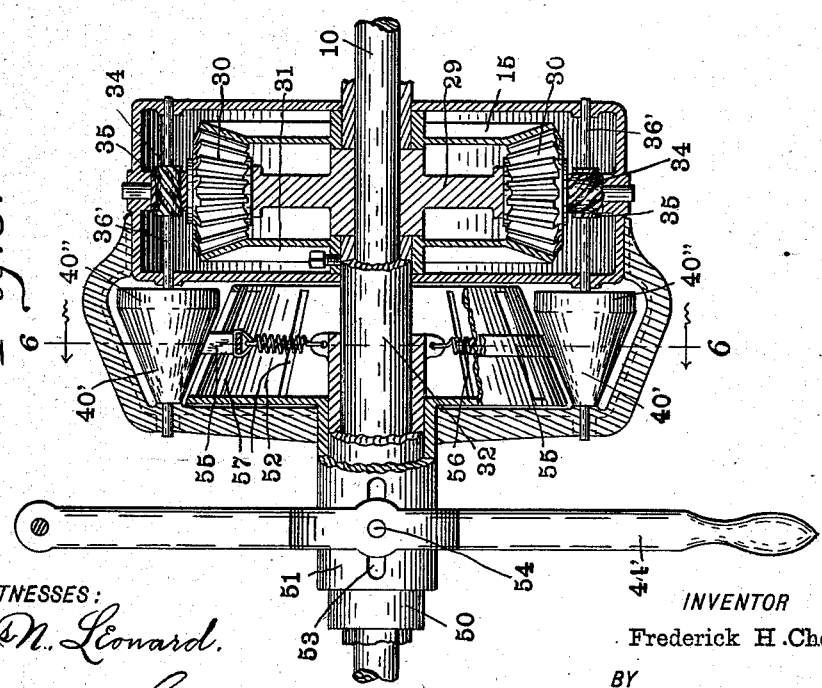

Figure 1 is an axial section. Fig. 2 is an elevation of the right-hand end of Fig. 1. Fig. 3 is a section on line 3 3 of Fig. 1. Fig. 4 is a section on line 4 4 of Fig. 1. Fig. 5 is an axial section of a modification of the left-hand end of Fig. 1. Fig. 6 is a section on line 6 6 of Fig. 5. Fig. 7 is a detail of a modified form of the modification shown in Fig. 5.

In the drawings, 10 indicates a driven shaft, to which is secured a bevel-gear 11, said gear rotating with shaft 10. Sleeved upon shaft 10, adjacent gear 11, is a frame 12. Sleeved upon shaft 10, adjacent frame 12, is a sleeve 13, to which are secured two bevel-gears 14 and 15, the teeth thereof facing in opposite directions and the teeth of gear 14 facing the teeth of gear 11.

Revolubly mounted upon frame 12 are planetary transmission-pinions 16, as many as may be desired, said pinions meshing with and connecting the gears 11 and 14. Each pinion 16 is provided with a hub 17, which is adapted to be frictionally engaged by a pair of clamps 18 18, which surround the hub. Clamps 18 are pivoted at 19 in a casing 20, which incloses gears 11, 14, and 16 and the adjacent parts and is revoluble upon shaft 10 and sleeve 13. Clamps 18 are provided with fingers 21, which are adapted to be engaged by one end of a lever 22, pivoted upon the casing. The inner ends of the levers 22 are connected to a collar 23, sleeved upon shaft 10 and connected to a shift-lever 24.

Surrounding casing 20 is a friction-belt 25, which may be clamped upon or released from casing 20 by any suitable means, such as a shaft 26 and operating-lever 27, the said operating-lever, if desired, lying within a slot 28, formed in lever 24, so that a movement of shaft 26 will simultaneously operate to shift lever 24.

The mechanism thus far is similar in construction and practically identical in operation in many respects to the construction shown in Patent No. 686,386, issued to me November 12, 1901, with the exception of the addition of gear 15, which does not appear in said patent.

Sleeved upon shaft 10, adjacent gear 15, is a frame 29, upon which are revolubly mounted planetary transmission-pinions 30, which mesh with gear 15 and also mesh with a driving-gear 31, secured to a sleeve 32, sleeved upon shaft 10, adjacent frame 29. Sleeve 32 carries a suitable driving-pulley 33. Each pinion 30 is provided with a hub having a spiral gear 34 formed thereon, and said spiral gear meshes with a spiral gear 35, carried by a shaft 36, rotatably mounted in suitable bearings formed in a casing 37. Casing 37 is sleeved upon sleeves 13 and 32 and surrounds gears 15, 31, and 30 and the adjacent parts, the casing being, preferably, oil-tight, so that the several gears may run in oil. Shaft 36 carries at its outer end a pinion 38, which meshes with an internal gear 39, carried by a planetary friction-cone 40, rotatably mounted upon a shaft 41, carried in a frame 42, carried by casing 37. Sleeved upon sleeve 32 is a disk 43, held against rotation and axially moved upon sleeve 32 by means of a shifting-lever 44. The several transmission-cones 40 are so placed that one line in the periphery of each is parallel with the axis of shaft 10, and the said cones are arranged equidistant from the shaft. Disk 43 is of such a size as to engage the peripheries of all the cones 40, said cones being of such length, however, that by shifting disk 43 axially (to the right in Fig. 1) to one extreme of its movement the disk may be carried free of engagement by the cones.

The operation is as follows: Suppose lever 27 to be moved to the position shown in Fig. 1, in which case band 25 will be clamped upon casing 20, so as to hold the same against rotation, and levers 22 will be withdrawn from clamps 18, so that said clamps will not exert detaining pressure upon the hubs of pinions 16. Suppose also that disk 43 be shifted to the right until it passes out of engagement by cones 40. If pulley 33 be rotated in the direction indicated by the arrow, it will, through sleeve 32, cause a similar rotation of gear 31. Gears 30 are prevented from rotation by reason of the spiral gears 34 and 35 and therefore act as a clutch between gear 31 and gear 15, so that the gears 31, 30, and 15 and casing 37, together with the parts carried thereby, are rotated as a unit, the said rotation causing a similar rotation of gear 14. The rotation of gear 14 will cause a rotation of gears 16 in the direction indicated by the arrow in Fig. 1, and by reason of the fact that casing 20 is held stationary by band 25 gears 16 will act as transmission-gears between gears 14 and 11, and thus rotate gear 11 (shaft 10) in the direction indicated by the arrow in Fig. 1—i.e, in the direction opposite to that of driving-pulley 33—the speed of rotation being the same, because in the present case the gears 11, 14, 15, and 31 are shown of equal size. This is the maximum speed of rotation of shaft 10 in the direction indicated, and if a slower speed is desired the operator shifts lever 44 so as to bring disk 43 into position where it can be engaged by cones 40, the said cones having a planetary movement about the disk and by reason of friction with the disk being given also a movement about their own axes in the direction indicated by the arrow. Such rotation of the cones 40 causes a rotation of shafts 36 in the direction indicated by the arrows, and such a rotation through spiral gears 34 and 35 causes gears 30 to yield in the direction of movement of gear 31, thus allowing gear 15 (and the gear 14, attached thereto) to lag behind, such lagging, therefore, reducing the final speed of gear 11 and shaft 10 to a corresponding amount. Suppose now that disk 43 be moved out of engagement of cones 40 and lever 27 be thrown so as to release casing 20 and so as to cause lever 24 to shift levers 22 into engagement with the fingers 19 of clamps 18 and clamp said clamps upon the hubs 17 of the pinions 16, so as to prevent any angular rotation thereof. In this case the operation will be as follows: Pulley 33 and sleeve 32 will rotate gear 31 in the same direction as before and pinions 30 will form a clutch between gear 31 and gears 15 and 14, so that said gears 15 and 14 will rotate in the same direction as before. Pinions 16 cannot, however, rotate upon their axes as before, but instead form a clutch between gears 14 and 11, and thus cause a rotation of gear 11 and shaft 10 in a direction opposite from that indicated by the arrow—i. e., in the same direction as pulley 33. By shifting disk 43 into position where it can be engaged by cones 40 the speed of rotation of the shaft 10 may be decreased in the same manner as has already been described.

In Fig. 5 I have shown a slight modification of the means for controlling the movement of the planetary cones. In this case each cone 40' is carried upon shaft 36', which carries the spiral gear 35. Sleeved upon sleeve 32 is a sleeve 50, and sleeved upon said sleeve 50 is a sleeve 51, which carries a cone 52, the face of which is parallel to the adjacent faces of cones 40'. Sleeve 51 is provided with a slot 53, through which projects a pin 54, which pin projects into sleeve 50 and is carried by the shifting-lever 44'. A belt 55 forms a driving connection between cone 52 and cones 40', and bights 55' of said belt are carried through slots 52'', formed in the periphery of cone 52 into the interior of the cone, each of said bights being connected by a spring 56 to the inner end of sleeve 50. Cone 52 is provided between each pair of slots 56 with slots 57, in each of which is slidably mounted shoe 58, to which belt 55 is attached. Shoe 58 is tubular, as shown, and into each of said shoes projects a pin 59, carried by sleeve 50. Each shoe 58 also carries an arm 60, which engages the adjacent two bights 55' of the belt, the said arms being alternately arranged upon opposite sides, as indicated in dotted lines, and the arrangement being such that by shifting sleeve 50 belt 55 may be shifted axially on the cone, so as to vary the speed of rotation of cones 40'. Each cone 40' is, at its base, provided with a portion 40'' of such dimensions that belt 55 may be shifted upon cone 52 to a point where it will have no effect upon cones 40'.

Instead of the construction shown in Figs. 5 and 6 the belt forming a driving connection between the two cones 52 and 40' may be composed of a spiral-spring core 61, incased in a suitable rubber casing 62, as shown in Fig. 7.

It will be readily understood that the driving element may become the driven element and the driven element become the driving element without departing from my invention.

I claim as my invention—

1. In a speed-changing gearing, the combination with the driving and driven elements, of a planetary transmission element adapted to form a connection therebetween, and rotatable planetary means for allowing angular rotation of said transmission element with relation to the driving and driven elements, to vary the relative rotation thereof.

2. In a speed-changing gearing, the combination with the driving and driven elements, of a planetary transmission element forming a connection therebetween, means for restraining angular rotation of the transmission element, a rotatable planetary element connected to the transmission element, and means for varying the speed of angular rotation of said rotatable planetary element to vary the degree of restraint against angular rotation of the transmission element.

3. In a speed-changing gearing, the combination with the driving and driven elements, of a planetary transmission element forming a connection therebetween, a planetary cone, means operated by the angular rotation of the cone for controlling the angular rotation of the transmission element, and means for varying the degree of angular rotation of the cone.

4. In a speed-changing gearing, the combination with the driving and driven elements, of a planetary transmission element forming a connection therebetween, a planetary cone, means operated by the angular rotation of the cone for controlling the angular rotation of the transmission element, a disk upon which the cone may roll in its planetary movement, and means for shifting the disk axially with relation to the cone so as to vary the speed of angular rotation thereof.

5. In a speed-changing gearing, the combination with the driving and driven elements, of a planetary transmission element forming a connection therebetween and carrying a spiral gear, a planetary shaft, a spiral gear carried by said shaft and meshing with the first-mentioned spiral gear, a planetary cone adapted to angularly rotate the planetary shaft by reason of its angular rotation, means upon which said cone may roll in its planetary movement so as to cause angular rotation thereof, and means for varying the degree of angular rotation of the planetary cone.

6. In a speed-changing gearing, the combination with a driven shaft, of a driving-gear revolubly mounted thereon, a driven gear revolubly mounted upon the shaft and drivingly connected thereto, a supporting-frame rotatably mounted upon the shaft, a planetary transmission-gear rotatably mounted upon said frame and adapted to mesh with the driving and driven gears, means for restraining angular rotation of said transmission-gear, a planetary cone rotatably mounted upon the frame, intermediate driving connections between the cone and restraining means whereby an angular rotation of the cone will control the degree of restraint against angular rotation of the planetary gear, a disk about which the cone may revolve, and means for shifting said disk axially with relation to the cone so as to vary the amount of angular rotation thereof.

7. In a speed-changing and reversing gear, the combination with the driving and driven elements, of an intermediate transmission element, a planetary transmission element forming a connection between the driving element and the intermediate transmission element, a second planetary transmission element forming a connection between the intermediate transmission element and the driven element, means for restraining angular rotation of the first-mentioned planetary transmission element, means for varying the degree of restraint of said first-mentioned planetary element against angular rotation, and means for preventing angular rotation of the second planetary transmission element and allowing planetary movement thereof or for preventing planetary movement of said planetary transmission element and allowing angular rotation thereof.

8. In a speed-changing and reversing gearing, the combination with the driving and driven elements, of an intermediate transmission element, a planetary transmission element forming a connection between the driving element and the intermediate transmission element, means for controlling the degree of angular rotation of said planetary transmission element, a rotary frame, a second planetary transmission element rotatably mounted in the frame and forming a connection between the intermediate transmission element and the driving element, a friction-clutch arranged to engage said second planetary transmission element and restrain the same against angular rotation, a brake arranged to engage the frame so as to hold the same and prevent planetary movement of the second planetary transmission element, and means for throwing the brake into action and the clutch out of action or the brake out of action and the clutch into action, for the purpose set forth.

9. In a speed-changing and reversing gearing, the combination with a driven shaft, of a driving-gear revolubly mounted thereon, an intermediate transmission element consisting of a pair of gears revolubly mounted upon the shaft, a casing revolubly mounted upon the driving-gear and the intermediate gear, a planetary transmission-gear revolubly mounted in the casing and meshing with the driving-gear and one end of the intermediate transmission-gears, means for controlling the degree of angular rotation of said planetary transmission-gear, a driven gear carried by the shaft, a second casing revolubly mounted upon the shaft and the intermediate transmission-gear, a second planetary transmission-gear revolubly mounted in the second casing, a clamp adapted to engage the second planetary transmission-gear and prevent angular rotation thereof, a brake adapted to engage the second casing so as to prevent rotation thereof, means for throwing the clamp into and out of engagement with the second planetary transmission-gear, and means for throwing the brake out of and into engagement with the second casing.

10. In a speed-changing and reversing gearing, the combination with the driven shaft, of the driving-gear sleeved thereon, a pair of intermediate gears also sleeved upon the shaft and rotatable together, a driven gear secured to the shaft, a supporting-frame sleeved upon the shaft, a planetary transmisson-gear revolubly mounted on said frame and adapted to mesh with the driving-gear and one of the intermediate gears, a spiral gear formed in the hub of said planetary transmission-gear, a second spiral gear meshing with the first spiral gear and carried by a shaft mounted in the frame, the said shaft, a planetary cone revolubly mounted on the frame and drivingly connected with said second spiral gear, a disk sleeved upon the sleeve of the driving-pulley in position for the cone to roll peripherally thereon, means for preventing rotation of the disk and for shifting said disk axially, a second frame rotatably mounted upon the shaft, a second planetary gear carried by the second frame and meshing with one of the intermediate transmission-gears and with the driven gear, a clutch arranged to engage said second planetary gear to prevent angular rotation thereof, a brake arranged to engage the second casing and prevent rotation thereof, and means for throwing the clutch into or out of operation and the brake out of or into operation, substantially as and for the purpose set forth.

In witness whereof I have hereunto set my hand and seal, at Indianapolis, Indiana, this 20th day of March, A. D. 1902.

FREDERICK H. CHEYNE. [L. S.]

Witnesses:
ARTHUR M. HOOD,
JAMES NELLER.